J. R. PEIRCE.

RECORDING MECHANISM.

APPLICATION FILED MAR. 24, 1920.

Reissued July 13, 1920. 14,915.

11 SHEETS—SHEET 1.

INVENTOR

*John Royden Peirce*

BY ATTORNEYS

*R. M. Thomas & Sons*

J. R. PEIRCE.

RECORDING MECHANISM.

APPLICATION FILED MAR. 24, 1920.

Reissued July 13, 1920.

14,915.

11 SHEETS—SHEET 2.

INVENTOR

John Royden Peirce

BY ATTORNEYS

Anthony Usma

J. R. PEIRCE.
RECORDING MECHANISM.
APPLICATION FILED MAR. 24, 1920.

Reissued July 13, 1920.

14,915.
11 SHEETS—SHEET 3.

INVENTOR
John Royden Peirce

BY ATTORNEYS
R. Anthony Ulina

J. R. PEIRCE.
RECORDING MECHANISM.
APPLICATION FILED MAR. 24, 1920.
Reissued July 13, 1920.
14,915.
11 SHEETS—SHEET 4.
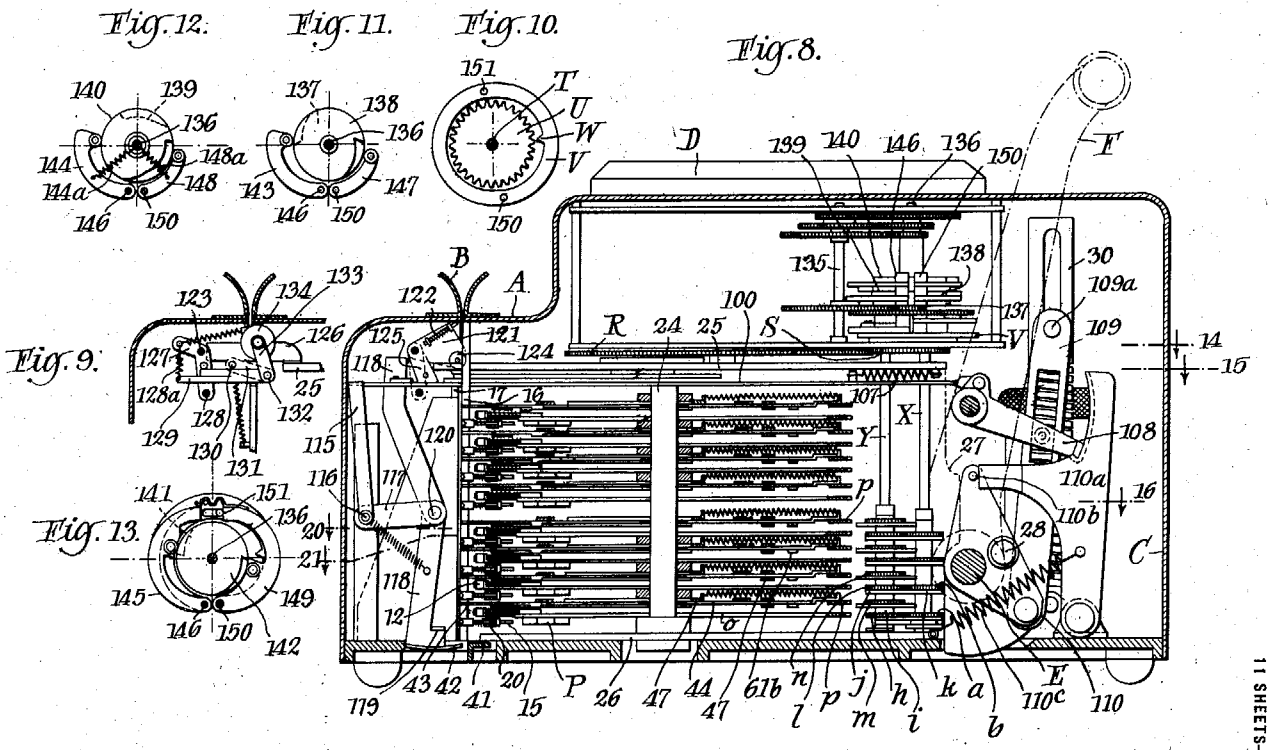
INVENTOR
John Royden Peirce
BY ATTORNEYS
Anthony Ulma

J. R. PEIRCE.

RECORDING MECHANISM.

APPLICATION FILED MAR. 24, 1920.

Reissued July 13, 1920.

14,915.

11 SHEETS—SHEET 5.

INVENTOR

John Royden Peirce

BY ATTORNEYS

Anthony & Ulma

J. R. PEIRCE.

RECORDING MECHANISM.

APPLICATION FILED MAR. 24, 1920.

Reissued July 13, 1920.

14,915.

11 SHEETS—SHEET 6.

INVENTOR

John Royden Peirce

BY ATTORNEYS

R. Anthony Lina

J. R. PEIRCE.
RECORDING MECHANISM.
APPLICATION FILED MAR. 24, 1920.
Reissued July 13, 1920.
14,915.
11 SHEETS—SHEET 7.
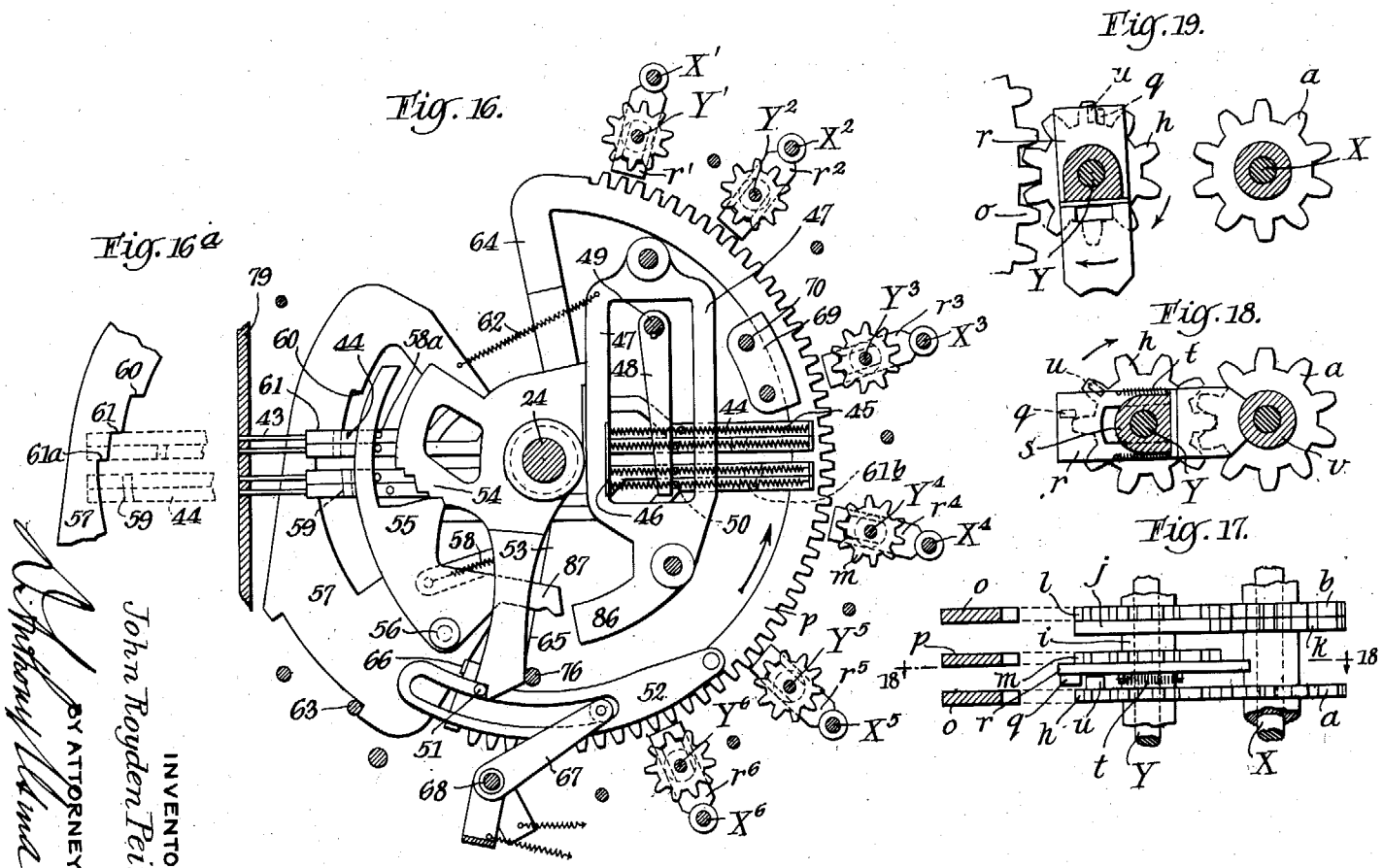
INVENTOR
John Royden Peirce
BY ATTORNEYS
D. Anthony Usina J. R. PEIRCE.
RECORDING MECHANISM.
APPLICATION FILED MAR. 24, 1920.
Reissued July 13, 1920. 14,915.
11 SHEETS—SHEET 8.
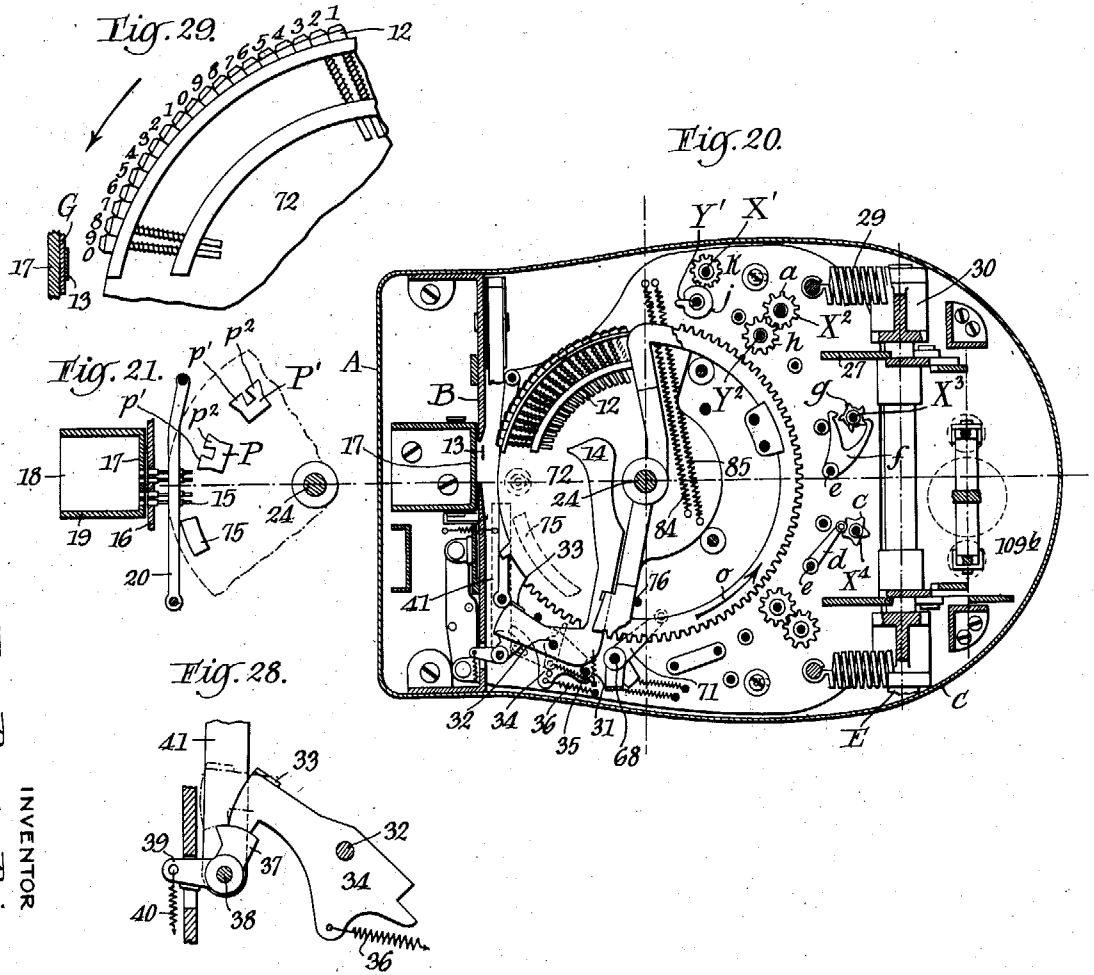
INVENTOR
John Royden Peirce
BY ATTORNEYS
W. Anthony Mills J. R. PEIRCE.
RECORDING MECHANISM.
APPLICATION FILED MAR. 24, 1920.
Reissued July 13, 1920.
14,915.
11 SHEETS—SHEET 9.
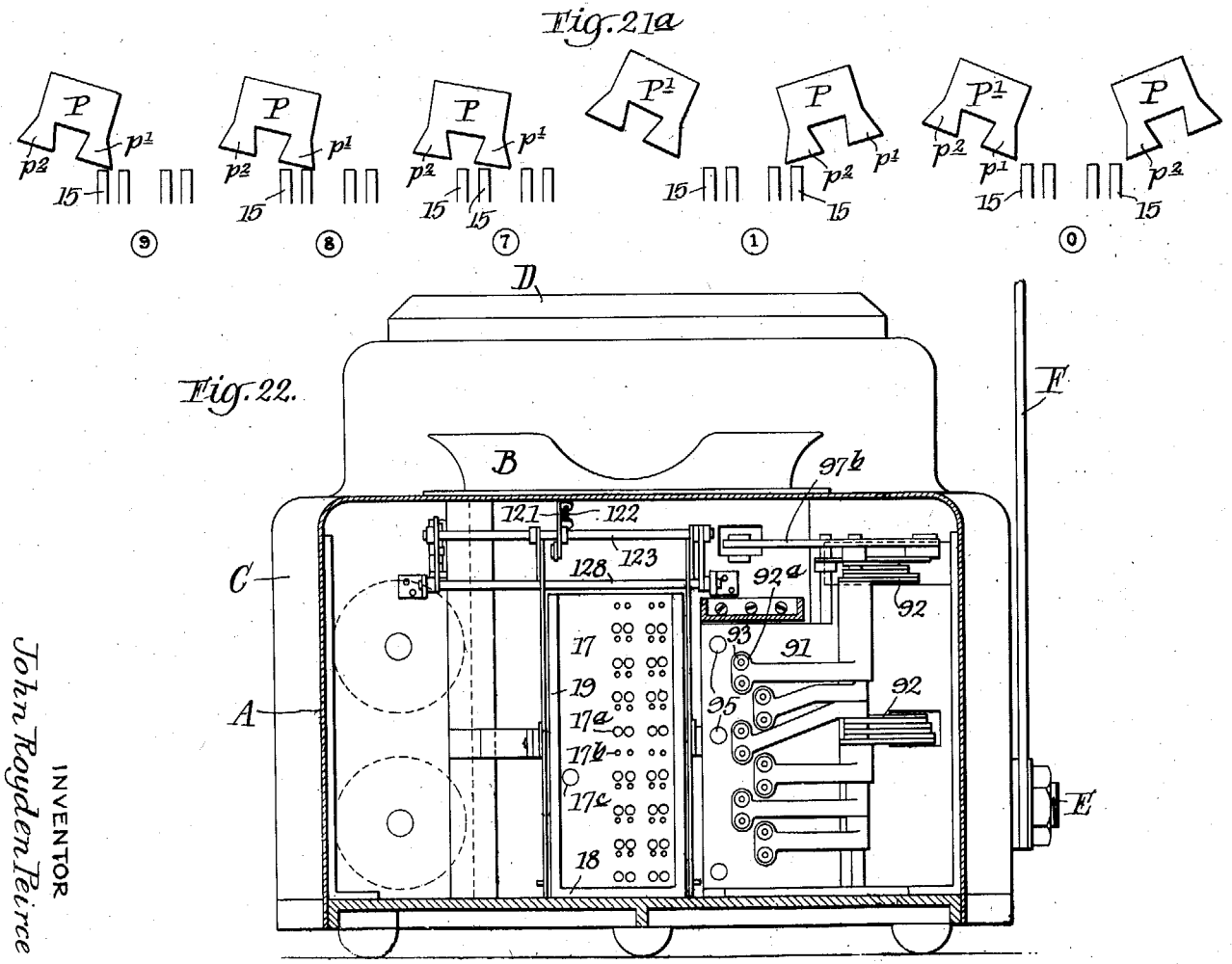
INVENTOR
John Royden Peirce
BY ATTORNEYS
D. Anthony Usina J. R. PEIRCE.
RECORDING MECHANISM.
APPLICATION FILED MAR. 24, 1920.
Reissued July 13, 1920.
14,915.
11 SHEETS—SHEET 10.
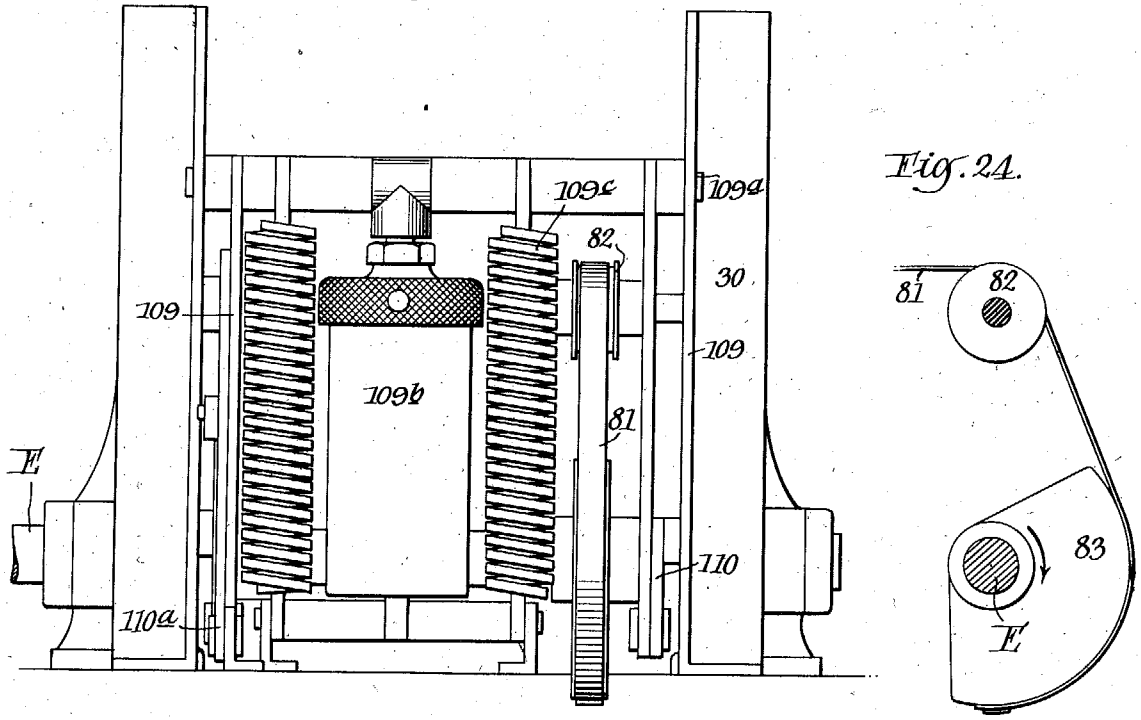
INVENTOR
John Royden Peirce
BY ATTORNEYS
D. Anthony Mills

J. R. PEIRCE.

RECORDING MECHANISM.

APPLICATION FILED MAR. 24, 1920.

Reissued July 13, 1920.

14,915.

11 SHEETS—SHEET 11.

INVENTOR

John Royden Peirce

BY ATTORNEYS

Anthony Ulina

UNITED STATES PATENT OFFICE.

JOHN ROYDEN PEIRCE, OF NEW YORK, N. Y.

RECORDING MECHANISM.

14,915. Specification of Reissued Letters Patent. Reissued July 13, 1920.

Original No. 1,260,705, dated March 26, 1918, Serial No. 489,440, filed April 12, 1909. Application for reissue filed March 24, 1920. Serial No. 368,413.

*To all whom it may concern:*

Be it known that I, JOHN ROYDEN PEIRCE, a citizen of the United States, residing in the borough of Manhattan, city, county, and State of New York, have invented new and useful Improvements in Recording Mechanism, of which the following is a specification.

In a previous application, No. 427,859 (Patent No. 1,219,765), I have shown and described a machine specially designed as a workman's time recorder adapted to calculate and record wages as well as time; and a card upon which such wages and time were recorded in print and in perforations, and certain advantageous methods of performing such operations. In another application, No. 441,618 (Patent No. 1,110,643), I have described an apparatus for recording the movement of a meter or other device of the sort.

The present invention provides a machine specially designed for calculating and recording the time and cost of labor expended upon particular pieces of work, or the time and cost of use, of particular machines (such as telephone, for example), and in general the time and cost or the time or cost expended in any operation which may be measured by clocks, meters, machinery registers, and in fact any machines whose progress is to be recorded. The machine of this invention is similar in various functions and mechanisms to the machines illustrated in the applications above referred to. It is common in factories and work-shops to keep a time-book or similar record showing for an individual job the amount of time spent by one or more workmen on such job, from which the cost of labor on the job is subsequently determined according to the wages of the workmen employed. It is common also in long-distance telephone offices to use time-stamps for recording the time of beginning and ending a message, or, in some cases, recording the elapsed time, and similar recording systems are in use in various businesses. The particular machine hereinafter described is specifically designed for keeping a record of the cost of labor or any other item which may be measured in units of time. Preferably a card is used which is put into the machine and subjected to the operation of the latter at the beginning and again at the end of a continuous interval of work upon the job during a day. The first operation on the card may record the time of beginning work. Preferably however it records the money value of such time, either with or without the time in hours and minutes; the record being perforated to indicate the amount (of money and of time) according to a determined system of perforations, and being also typewritten or not on the card as desired. The second operation on the card makes a record of the elapsed time either in money or in hours and minutes, and preferably in both. In this second operation the machine is under control of the clock indicating the time at which the second operation is performed and of the perforations made at the first operation; and calculates and records the difference between the two. In the second operation there is preferably both a printing and a punching of the record; the printing so that the amount may be easily read, and the punching so that the card may be used to control the operation of a listing machine in which a number of similar cards relating to the same job cause the machine to make a list of all the items of cost of such a job. In this listing machine various other cards, for showing the cost of material, the cost of freight, etc., perforated according to a system similar to that used in the machine of this invention, would be used in connection with such card. Such a listing machine would be preferably arranged to take off subtotals and grand totals, and might make carbon or other duplicate copies for use in different departments, and would be arranged to take only the record of elapsed time from the cards; forming in this way a very important machine in a shop using the time-recording machine of this invention.

Various other advantages of the invention are referred to in detail hereinafter; and it will be understood that the improvements may be applied to various accounting or statistical machines other than that herein shown.

The accompanying drawings illustrate embodiments of the invention.

Figure 1 is a perspective of the machine;

Figs. 2, 3 and 4 respectively are face views of a card before use, after the first operation, and after the second operation respectively;

Fig. 8 is an approximately central transverse section of a complete machine;

Fig. 9 is a section in a parallel plane of part of the mechanism shown in Fig. 8;

Fig. 10 is a horizontal section showing the means for transmitting the movement of the clock to the recording mechanism;

Figs. 11 and 12 are horizontal sections of the mechanism for connecting and disconnecting the clock with the recording mechanism;

Fig. 13 is a similar section showing the connection of this mechanism with that of Fig. 10;

Fig. 16 is a partial plan and a partial horizontal section showing one of the mechanisms for determining the first reading and subtracting it from the second, the plane of section being indicated approximately by the line 16 of Fig. 8;

Figure 15:
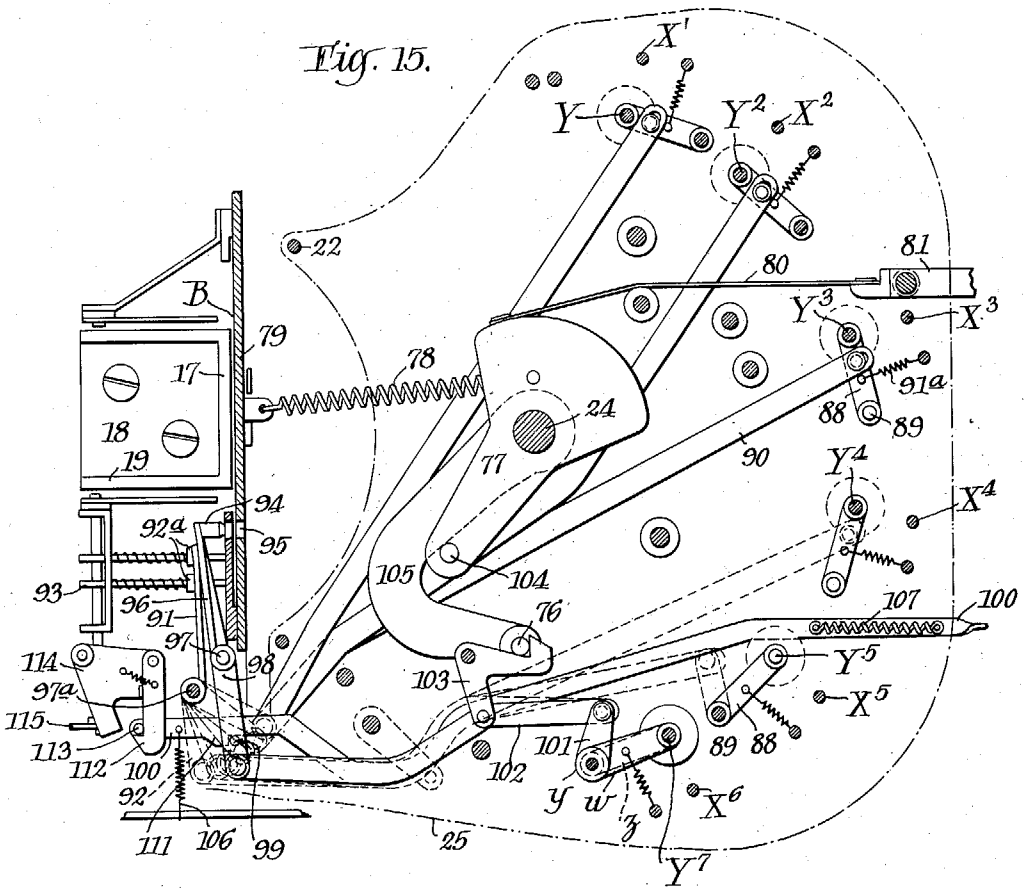
Fig. 15 is a partial plan and a partial horizontal section just below the top plate of the recording mechanism and approximately on the line 15 of Fig. 8.
Figure 30:
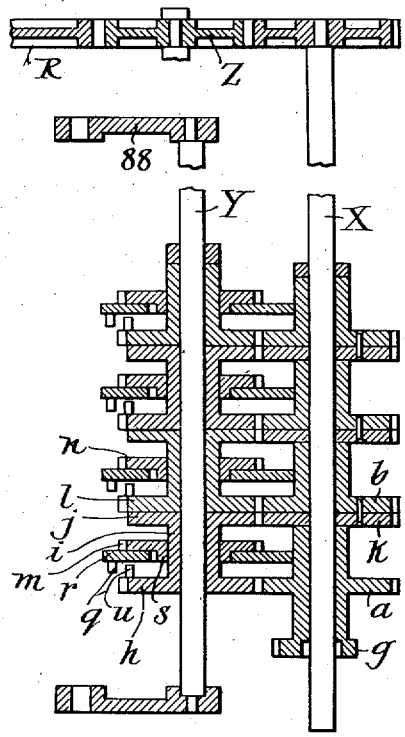
Figure 25:
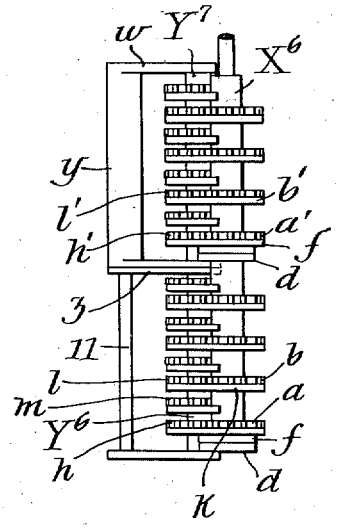
Figure 26:
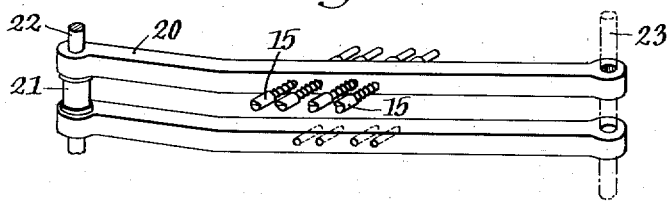
Figure 27:
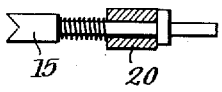

Fig. 16[a] is a detail of Fig. 16 on a lower plane;

Fig. 17 is an elevation of a unit of one of the rate mechanisms;

Figs. 18 and 19 are horizontal sections of the same (on the line 18—18) in alternate positions;

Fig. 20 is a horizontal section approximately on the plane indicated at 20 in Fig. 8, and showing one of the type carriers; the rate mechanisms being indicated in different planes of section for convenience;

Fig. 21 is a section approximately on the plane indicated at 21 in Fig. 8, and showing the punch-operating plate which lies immediately below the type carrier of Fig. 20;

Fig. 21[a] is an enlargement of the parts shown in Fig. 21, showing them in several different positions;

Fig. 22 is partly a longitudinal section and partly an elevation showing the parts of Fig. 15;

Fig. 23 is a rear elevation of the machine;

Fig. 24 is a detail of a connection to the hand shaft;

Fig. 25 is an elevation of a special mechanism for controlling the recording of hours and minutes;

Fig. 26 is a perspective view of a frame for carrying the punches;

Fig. 27 is a section of the same showing the mounting of a single punch;

Fig. 28 is a detail in plan of the hammer-controlling mechanism;

Fig. 29 is an enlarged detail of Fig. 20;

Fig. 30 is a sectional view of the rate shaft and connected mechanism.

Referring to the embodiment of the invention illustrated, the casing of the machine contains a front portion A carrying the card pocket B, and a rear portion C, carrying the clock and intermediate mechanism, the clock D being preferably mounted horizontally or approximately so on the top of the casing. The hand shaft E projects at the side of the machine and carries a handle F by which it is operated. At the beginning of a job a card is introduced as far as it will go into the pocket B, and the handle F is pulled and allowed to return, and the card withdrawn. The same operation is repeated at the end of the job or of the day's work on that job, using the same card as for the first operation.

Figure 1:
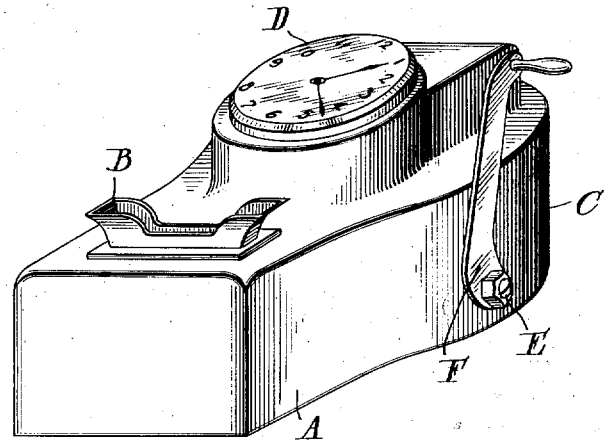
Figure 2:
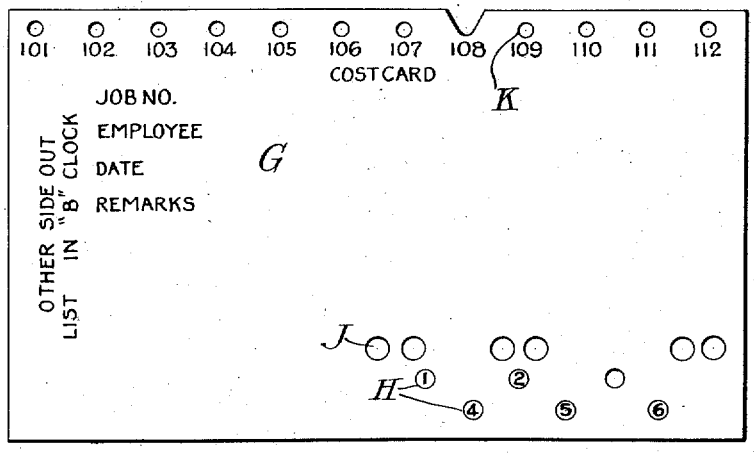
Figure 3:
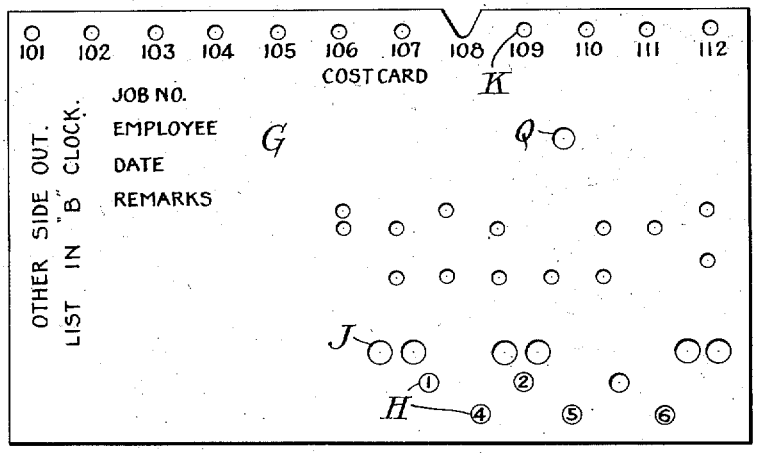

*Cards.*—Before use the card is as shown in Fig. 2, containing a number of controlling perforations, at the sides. After the first operation it is as shown in Fig. 3, perforated according to the time and to the amount of money represented by such time at the particular rate selected, and containing also a perforation for controlling its position at the next operation. After the second operation its appearance is as in Fig. 4, where it contains a second set of perforations, representing the elapsed time in hours and minutes and also in dollars and cents, and is printed to indicate the same items.

The card G contains originally various printed points of information and direction, as shown, and these may be of course varied according to the system used in the shop. The card may be perforated to convey this information to the listing machine in which it is subsequently to be used, or the information may be written on in pencil by the workman himself. The card is provided with a number of spaces H, numbered respectively 1, 2, 3, 4, 5 and 6, for determining the rate of charge per hour, any desired one of these spaces being punched so as to obtain for example the third rate. The card is also provided in the beginning with pairs of setting holes J for determining the accurate setting of the card in the pocket in proper position relatively to the punches and feeling pins hereinafter referred to. The cards are preferably supplied in different colors with different rate holes already punched in them, and the different grades of men could use differently colored cards; thus insuring in a simple way the charging of the cost at a correct rate. In cases where this is not possible it will generally be necessary for the foreman to give the workman the card perforated with the correct rate. Or the numbering of the cards may be such as to indicate which rate space is perforated. Thus cards numbered between 1 and 100 might be used by four-dollar-a-day men; between 1000 and 2000, five-dollar-a-day men, etc. In this case the employee would simply select a card between the limiting numbers of which his number lies. It is practically impossible to manipulate the mechanism so as to secure any other than the desired rate when this arrangement of rate holes is used. As a precautionary measure in an establishment having a number of shops, each shop may have a different and independent arrangement of holes in its cards. That is to say, the position of the five-dollar holes in the cards of one shop may be different from that in the cards of another shop.

A simple provision is made for facilitating the selection of all cards relating to a job of a particular number. The cards after being perforated the second time, or at the close of each day, are kept in boxes or drawers like those used in ordinary card catalogues. On one or more edges of the card a series of holes K is provided, and the job numbers which they represent are printed alongside of them. The foreman when he wishes to identify a card with a certain job number, punches the intervening space between the hole representing the job and the edge of the card (as for number 108 in the example shown.) When the cards are arranged on edge in the tray the running of a needle through the first hole and the lifting of such needle will separate all the cards except those which have had the intervening space between the edge of the card and that particular hole removed. By repeating this through each set of holes consecutive cards for each of the different jobs can be separated in a few moments. To make it practicable for the shop it will be necessary for the foreman to have a key card. In this way it would be unnecessary to print the job numbers on the separate cards. This method of selecting the cards constitutes no part of the invention claimed herein, but is described to make clear the uses of the card.

Figure 5:
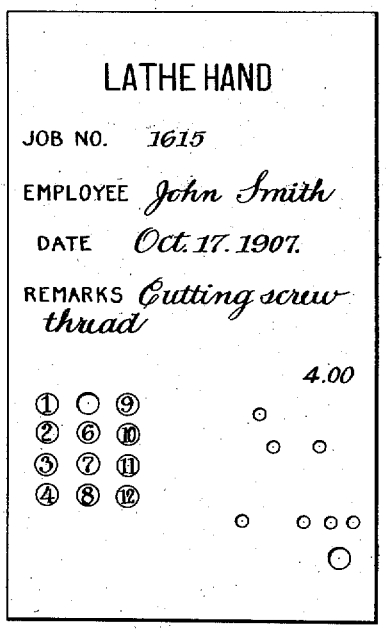
Figs. 5 and 6 are face views of modified styles of card which may be used.

Fig. 5 shows another arrangement of items on the card by which greater compactness is secured. By reducing the size or the quantity of printed matter the size of the card might be still further reduced. In fact this as well as the other cards described might always be reduced to a size very little greater than that necessary for the perforations made by the machine.

Figure 4:
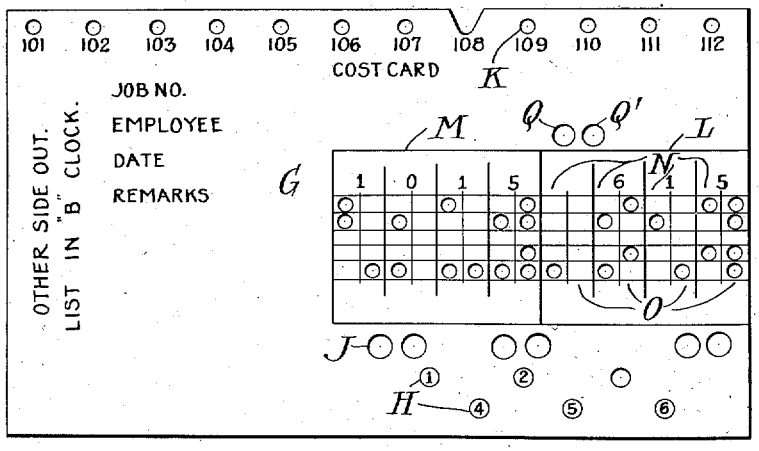
Figure 6:
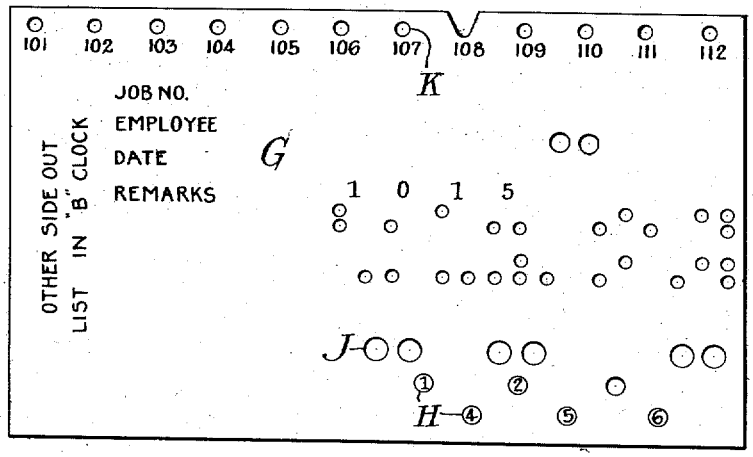

The card of Fig. 6 differs from that of Fig. 4 only in suppressing the printed amount to be charged against the job, so that it will be difficult for the workman or any other than the listing clerk to know the amount of money which is charged for the work. The time is shown in hours and minutes so that the workman may be kept informed on this point. The amount is indicated only in perforations so as to properly control the listing machine in which the card is subsequently used.

The design of the cards and the arrangement of the various parts thereof and perforations thereon may be substantially varied from those shown.

*The system of perforations.*—Various systems for perforating the cards may be used, and I have described a variety of such systems in my previous applications above referred to and others. In the present machine I prefer to arrange the perforations for each numeral in a vertical line, using various combinations of four perforations (Fig. 7) or less as the minimum number which can be used to represent ten different digits, and arranging these four holes over five different spaces for simplicity in the mechanism. The card is shown ruled in Fig. 4 for the purpose of explaining the locations of the various parts, but in use it will ordinarily not be ruled. The amount space is indicated at L and the time space at M. Commencing at the right-hand side of the card, the first, third, fifth and seventh columns represent the numerals 5, 1, 6 and 0 respectively, and these numerals are printed (with the exception of the zero at the left of the amount which is suppressed in the ordinary writing of numbers) on the line above the perforations and at points between the first and second columns, the third and fourth columns, etc. The first operation on the card perforates the columns N to represent the time at which the operation is performed. The second operation perforates the columns O to represent the elapsed time since the first operation, and prints the numbers corresponding to such elapsed time. The combinations of holes used to express the different numbers will be understood from Fig. 7, which shows openings in the punch-operating plates which avoid the operation of certain punches when the plates are advanced, and which correspond therefore to the unperforated spaces on the card for the same number. The punching plates, as indicated in plan at P, Fig. 21, have an intermediate open portion, and have solid portions at the ends, which include the two operative spaces at each end of the five-space combination.

*The machine in general.*—A number of gears are continuously rotated from the clock at different rates of speed, and these may be called the rate mechanisms. There are six such rates (corresponding to the hole spaces H on the card) provided for in the present machine, one being a straight time rate and the others being money rates. When a record is to be made on a card the pulling of the hand lever throws a selected rate mechanism into gear with the recording mechanism, and the recording mechanism is given a movement limited by the rate mechanism so as to bring the devices for recording the appropriate numbers in their operative positions; and thereupon the recording devices are advanced to push the appropriate combination of punches through the card, and (where the record is to be printed also) to release hammers which drive the printing type against the ribbon and the card. In the first operation on a card it moves clear to the lowest point in the pocket. A subsidiary punch, however, makes a hole Q therein, which, upon the next insertion of the card, controls a spacing mechanism which limits the downward movement of the card in the pocket to such a point as to insure the locating of the second series of perforations between the lines of the first series. The spacing mechanism is described hereinafter under "Card control at second operation." A second perforation Q′ (Fig. 4) is made at this second operation, which serves to indicate at a glance that the record has been completed (see hole $17^c$, in punching plate Fig. 22).

*Clock-driven mechanism.*—The movement of the clock is transmitted to the rate mechanisms from a master wheel R (Figs. 8 and 14) which is operated only during earning time. The master wheel is driven by a pinion S on a shaft T, the latter being provided with a gear U (Fig. 10) having pointed teeth, and which is intermittently engaged with and disengaged from an arm or ring V continuously rotated by the clock and having a tooth W which is brought into engagement with the gear U during earning time, and moved out of engagement therewith during the noon hour and at the end of the day. The control of this is explained more fully hereinafter under the title "Earning-time mechanism."

The motion of the master wheel is transmitted to the several rate mechanisms by gearing which drives these rate mechanisms at different speeds. Each rate mechanism comprises a shaft X in fixed relation with the master wheel, and a movable shaft Y containing gears driven from the fixed shaft X and carrying gears which take the motion of the fixed shaft X and impose it upon the recording mechanism at each operation of the machine, the shaft Y for this purpose being shifted from the engagement of its gears with those on the shaft X to engagement of its gears with sectors of the recording mechanism, and being at the end of each operation of the machine returned to maintain engagement with the shaft X. The several shafts X are indicated individually as X′, $X^2$, $X^3$, $X^4$, $X^5$ and $X^6$, and the several shafts Y are similarly distinguished as Y′, $Y^2$ etc.

Figure 14:
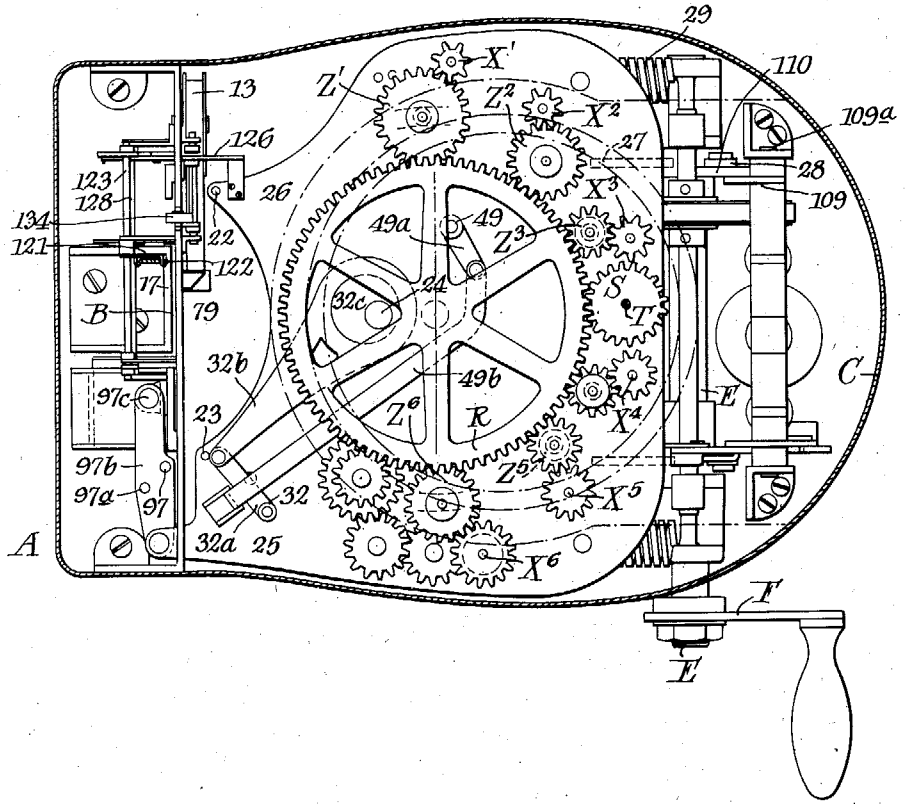
Fig. 14 is a horizontal view partly in section on the line 14 of Fig. 8.

Fig. 14 shows the several shafts X driven from the master wheel R at diminishing rates of speed relatively to each other by gears of appropriate size, which I designate generally as Z, and which are distinguished particularly as X′, $X^2$ etc., these being located between the master wheel R and the respective shafts Y′, $Y^2$ etc.

The motion of each shaft X is transmitted to gears *a*, *b*, etc., carried on sleeves on said shaft, the unit gear *a* of each group being driven at the same rate as the shaft X, and each successive gear being given, through the intermediation of the gears on the shaft Y, a step equal to one-tenth of a rotation for each complete rotation of the gear of next lower decimal place. The gears *a*, *b*, etc., on the shaft X, are given an intermediate movement by quick steps, instead of a slow continuous movement, so as to avoid any difficulty in the registering of the gears on the shaft X and Y with each other when they are brought together. The following description of the parts involved may be readily followed in Fig. 20 by observing that the various parts mounted on each shaft are detailed one by one on the other corresponding shafts in the order $X^4$, $X^3$, $X^2$, X′. This intermediate movement is secured by an escapement on the bottom of the shaft X comprising (see Figs. 20 and 25) a star-wheel *c* on the shaft X, which swings an arm *d* on a supplementary shaft *e* and thus oscillates an escapement anchor *f* on the same shaft which permits the step-by-step movement of an escapement wheel *g* which is loose on the shaft X and is pressed forward always by a spring driven by the shaft X; the escapement wheel *g* being connected with and driving the gear *a* on said shaft. The gear *a* on the shaft X drives a gear *h* (Figs. 8 and 17) on the lower end of a sleeve on the shaft Y, which sleeve *i* has at its upper end a one-toothed gear or disk *j* which drives a ten-toothed gear or disk *k* on the shaft X, the disk *k* being connected with the gear *b* so as to drive the latter. The gear *b* then drives the gear *l* of the second decimal place which is mounted on the shaft Y, and so the motion is transmitted to the end of the gearing. This is a common style of gearing in adding machines and is illustrated more fully in the sectional view, Fig. 30.

*Transmitting the motion of the rate mechanism to the recording mechanism.*—The gears *h*, *l* etc., constitute the first set of successively higher decimal places carried on the shiftable shafts Y. Said shafts carry also, loosely mounted thereon, a second set of gears *m*, *n* of successively higher decimal places, the gear *m* corresponding with the gear *h*, the gear *n* with the gear *l* etc. These alternate or intermediate gears *m*, *n*, etc., are designed to impose upon the recording sectors movements corresponding with the record made at the first operation, and are moved only upon the second operation. At the first operation on any card the gears *m*, *n* etc., are held stationary. For each decimal place there is a pair of toothed sectors, a lower one, *o*, (Figs. 8 and 19) in the plane of the clock-driven gear, as *h*, and an upper sector *p* (Fig. 16) in the plane of the previous-reading gear, such as *m*. At each operation of the machine the gears *h* and *m* are thrown into engagement with the sectors *o* and *p* respectively.

At the first operation on any card there is no previous reading, and the previous-reading sector *p* and its gear *m* are held stationary at the zero position as shown in Fig. 18 (by the stop pins 51 carried on links 52 connected to sectors *p* and stopped by plates 54, Fig. 16, which are initially locked as hereinafter described under "Previous-reading mechanism"). The previous-reading gears, as *m*, are provided each with a stop *q* (Figs. 18 and 17) carried on a slide *r* which slides inward and outward on a hub *s* which is fixed on the previous-reading wheel *m*, and which therefore rotates with said hub and wheel. Springs *t* are provided tending normally to throw the slide *r* to the operative position shown in Fig. 19 in which its stop *q* lies in the circular path of a zero stop *u* on the adjacent face of the corresponding clock-driven gear *h*. The slide *r* is preferably extended at its outer end and notched so as to normally engage the sleeve *v* on the fixed shaft X and thus prevent rotation of the gear *m*.

The amount registered by each of the clock-driven wheels *h* is represented by the distance which its zero stop *u* has advanced (clockwise looking downward on Fig. 18) beyond the point at which it would come into contact with the stop *q* on the slide above it if the latter were moved to its inner operative position. Ordinarily, however, the parts stand in the position of Fig. 18, and the slide *r* is moved outward by reason of the engagement of its inner end against the sleeve *v*, and its stop *q* is beyond the circular path of the zero stop *u* of the clock-driven wheel; so that the latter rotates freely. When the movable shaft Y has been shifted to bring the gears *h*, etc., into engagement with the sectors *o*, the latter are turned by springs (84, 85 Fig. 20, as hereinafter described) and carry with them the gears *h*, etc., out of engagement with clock-driven gears *a*, etc., and rotating the latter forward (through a distance which is necessarily the complement of the true clock reading) until their zero stops *u* strike the stops *q*, the latter being then in the paths of the several zero stops *u*. The plates *r* and stops *u* are held against rotation by reason of the engagement of the wheels *m* with the gears *p*, which are locked, as stated above. The sectors *o* thus receive a movement limited to the number of steps which each of the clock-driven gears has to advance in order to reach its next zero position. By reason of the reversed arrangement of the types (and likewise of the punches) as indicated in Fig. 29, this complementary movement of the sectors *o* brings into recording position the number representing the actual position of the clock. The number represented by the several digital sectors *o* is the number recorded at the first operation upon a card.

In the second operation of my card, the sector *o* engages the clock-driven gear *h* and turns it until its lug *u* strikes the corresponding lug *q* on the slide *r* as in the first operation; and, the sector *p* having been released by the inward movement of one or more of the feeling pins 43, Fig. 16, and being permitted a limited movement corresponding to the present reading, as hereinafter described, under "Previous reading mechanism", the gears *m* and slides *r* are also released, and the sectors *o* which carry the type are further advanced to the full extent of the present reading. It is desired to subtract the previous reading from the present reading of the clock-driven gears, and this subtraction is very simply performed by allowing the spring to impress upon the recording sectors *o* not only the amount of movement represented by the original position of the clock-driven gears, but an additional movement in the same direction and equal to the complement of the present clock reading. The reason for this rule is apparent upon considering the devices shown in Figs. 18 and 19 and the reverse arrangement of the types shown in Fig. 29. These types are carried only upon the lower sector *o* of each pair of sectors *o*, *p*. The sector *o* engages the lower gear *h* and the sector *p* engages the upper gear *m*. The type-carrying sector *o* will advance (in the direction of the arrow, Fig. 29), at each operation as far as the gear *h* with which it is engaged, will permit. Before a first operation on a card the gear *h* is found with its stop *u* advanced to a certain position corresponding to the time indicated by the clock. The shaft Y carrying the gear is then shifted toward the sectors and the gear *h*, in its time-indicating position, is brought into engagement with its sector *o*. The movement of the shaft Y toward the sector has released the slide *r* and allowed it to shift to bring its stop *q* in the circular path of the stop *u* of the gear *h*. When the sector *o* is then released its springs turn it in the direction of the arrow and the extent of its movement is limited by the stop *u* striking the stop *q*. Its actual movement is then a number of steps which is the complement of the actual time at which the gear $h$ stood; and by reason of the reversed arrangement of the types this complementary movement causes the printing of the correct number. When the number has been printed the segment $o$ is reset while still engaging the gear $h$, so that the gear $h$ is turned back to the position corresponding to the time, that is to say the position to which it had been set by the clock shaft before the recording operation. If the clock had moved to the third hour then the stop $u$ on the gear $h$ would stand three steps ahead of the stop $q$. In this position of the gear $h$, the shaft Y carrying the same is shifted back to bring the gears into engagement with those on the shaft X.

During the following intermission the gear $h$ is further advanced by the clock, the gear $m$ being stationary. At the second operation on the card the gear $h$ will be found further advanced than at the first operation. When the shaft Y is moved toward the sectors, if the sector $p$ remained locked and its gear $m$ stationary the plate $r$ and its stop $q$ would be found in the same position as for the first operation so that the movement of the gear $h$ would be merely the complement of the time at which it stands or the number of steps which it has advanced from the zero position. But on this second operation the plate $r$ does not remain stationary. The sector $p$ is unlocked and is allowed to move a distance equal to the reading at the first operation. If the reading at the first operation was 3 the plate $r$ and stop $q$ are allowed to move forward three steps as shown in Fig. 19. The movement of the gear $h$, therefore, would be three steps, or the amount of movement represented by the position of the clock at the first operation, in addition to the regular movement of the gear $h$ which is the complement of its present reading. By comparing these movements with the numbers indicated in Fig. 29 it will be seen that the total movement of the sector $o$ will bring that type into position which corresponds to the difference between the two times.

Thus if the present reading of any clock-driven wheel is 9, and the previous reading made on the card at its first operation is 3, the difference should be 6; and this is obtained by adding 1 (the complement of the clock reading 9) to the previous reading, 3, giving a total of four steps to the recording mechanism. The series of numbers is so arranged that these four steps carry the recording mechanism to the number 6 of the first series. Only the 6 is recorded, the successive decimal places of the mechanism being disconnected from each other so that there is no "carrying" of the additional 1 in the tens place to the next higher recording mechanism.

To subtract a larger from a smaller number, as a previous reading of 9 from a present reading of 3, the operation is substantially the same; that is we add the complement of 3, that is, 7, to the 9, and obtain 16; and moving the recording mechanism sixteen steps causes the recording of the proper difference, 4 by reason of the illustrated arrangement of the series of numbers. Here the recording mechanism passes beyond the first set of digits from 9 to 0, and this is always true in subtracting a larger from a smaller number; while the reverse is always true in subtracting a smaller number from a larger number. Where the subtrahend is larger than the minuend it is necessary to subtract 1 from the next higher decimal place, and this is effected by the circumstance that the recording mechanism is shifted beyond the first series of digits, as hereinafter described in detail.

Near the end of each operation before the sectors are disengaged from the gears, the sectors are returned to their starting position, returning the clock-driven gears to their starting position and the previous-reading gears and stops $q$ to their zero position, and the shafts Y are then thrown outward again to bring the clock-driven gears into engagement with the gears $a$, $b$ etc., on the fixed shaft X, so that they take up the movement of this shaft at the same point where they leave it off at the beginning of the operation.

*Time-recording mechanism.*—For recording the time in hours and minutes, a second group of recording devices and sectors is arranged above those for recording the amount in dollars and cents. The upper set of four recording devices shown in Fig. 8 is arranged for hours and minutes, and the lower set for dollars and cents. It is necessary therefore to provide a series of clock-driven wheels for the sectors of this time-recording mechanism, and such gears and the controlling mechanism therefor are indicated in Figs. 15 and 25. The fixed clock-driven shaft $X^6$ besides carrying wheels $a$, $b$ etc., for the lower amount-recording mechanism carries an upper set of clock-driven gears $a'$, $b'$ actuating gears $h'$, $l'$ carried on sleeves on a shaft $Y^7$ normally in line with the shaft $Y^6$ engaging the gears on the lower part of the shaft $X^6$, but adapted to be shifted independently of the shaft $Y^6$. For this purpose the shaft $Y^7$ is mounted in arms $z$ on a shaft 11 which passes freely through the sleeve $y$.

Figure 7:
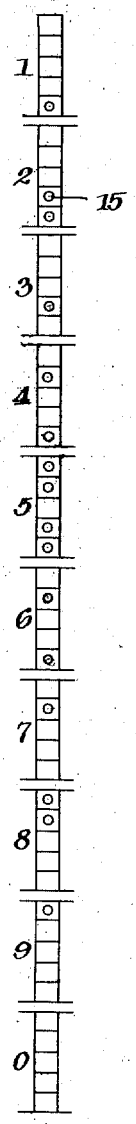
Fig. 7 is a development of part of a punching plate showing the system of perforations for a series of numerals from 0 to 9 with the positions of the punches superimposed to constitute a table illustrating the system.

*Recording mechanism.*—Each of the recording sectors $o$ is of sufficient length to engage all the clock-driven gears previously described, and to move in engagement therewith through a distance corresponding to two complete series of digits. The teeth are formed on a plate which is completely circular, and as shown in Fig. 20 carries on its upper face a double series of types 12 adapted to be brought by the rotation of the plate successively in line with a ribbon 13 so as, when struck by a hammer 14, to print upon a card carried in the pocket of the machine. On the under side of the plate *o* (Figs. 8 and 21) are carried the series of punching blocks or plates P previously described. The types 12 and blocks P are turned together to bring the proper type and block into register. The blocks thereafter actuate the punches by a forward movement of the plate *o*, but the types do not print until struck by the hammer 14. In the horizontal plane of the several blocks P P′ carried on the under side of each one of the plates or disks *o* is carried a series of punches 15 supported in a plate 16 and bars 20 and adapted to be forced through the paper in various combinations by the different blocks P P′ according to the various combinations of sockets produced by varying the positions of said blocks P P′ as shown in Fig. 7. Each movement of a block through one step, a distance corresponding to that between centers of successive punches, varies the combination of punches which shall be operated on the advance of the block.

The punches 15 pass through holes in the inner wall 16 of the card-pocket B, and an outer wall 17 is provided having similar perforations for receiving the punches and the feeling pins hereinafter described. In Fig. 22 the recording punch holes are shown at $17^a$, the feeling-pin holes at $17^b$, and the hole for determining the position of the card at a second operation at $17^c$, a punch like 15 being in register with the hole $17^c$ and being actuated at each operation of the machine to make the hole *q* or *q′* above referred to. The plate 17 is essential to back the card at the points where it is being perforated. It is preferably made removable, however, by having a base flange 18 which is screwed or similarly fastened to the base of the machine, and is preferably also stiffened by side walls 19. By removing the backing plate 17 for the card, the ends of the punches are made accessible for sharpening or the like.

Preferably the punches 15 are carried in a frame consisting of a number of cross-bars 20 (Figs. 8, 21, 26 and 27) extending between the horizontal planes of the disks and in the planes of the punch-operating blocks P P′. These cross-bars 20 are all fastened together at one end by sleeves 21, and are normally held in place by a rod 22 at one end threaded through the sleeves 21, and a rod 23 at the other end passing through holes in the free ends of the cross-bars 20, the rods 22 and 23 being passed down through the top plate and screwed into the bottom plate. This construction has the advantage that by first withdrawing the rods 22 and 23 the comb or frame consisting of the cross-bars 20 held together by the sleeves 21 and carrying all the punches 15, can be withdrawn in a lateral direction without interfering with the other parts of the mechanism. Figs. 26 and 27 indicate the construction. Such a frame carrying all the punches in exactly their desired positions and easily separable from the machine is of great advantage in permitting the ready repair or replacement of one or more of the punches without danger of disturbing the others or of disturbing the rest of the machine.

The proper punch actuating block P or P′ and type 12 having been brought to operative position, the continued movement of the handle forces forward the frame carrying the shaft 24 upon which the various disks are mounted, and thus punches the desired combination of perforations in the card. In the position of Figs. 21 and 29 the blocks will advance without actuating any punches and there will be no type struck; so that the record will be as shown for the figure 0 at the lower end of Fig. 7. At the next forward step of the plate the type 9 will be brought into position and the block P will be swung to the point shown in the first position of Fig. $21^a$; so that when the frame is forced forward the type 9 will be printed and the record of perforations will show the first space perforated, as indicated for the figure nine in Fig. 7. The next forward step, as shown in Fig. $21^a$, will bring the member *p′* of the block P in register with the first two punches 15 and will bring the type 8 into position; so that the record will be shown as for eight in Fig. 7. The next advance as shown in Fig. $21^a$ will bring the part *p′* of the block P into register with the second punch 15 and with the space between the second and third punch, and the space between the parts *p′* and $p^2$ will register with the first punch 15; so that only the second punch will be operated and we shall have the figure seven punched and perforated as shown by the table, Fig. 7. In the successive steps other combinations of perforations will be effected by means of the parts *p′* and $p^2$ of the block P according to the several arrangements shown in Fig. 7. As the plate advances we will come in turn to the position for the number one shown in Fig. $21^a$, where the number one is printed and the last one only of the punches 15 is operated. The last position shown in Fig. $21^a$ is for the intermediate number 0, with the part $p^2$ of the block P, clearing the last of the pins and the part *p′* of the block $P^2$ clearing by one step the first of the pins 15; so that the number 0 will be printed and no spaces will be punched. The next step will bring the block P′ in the first position shown for the block P Fig. 21[a], and the previous sequence will be repeated.

Thus, although the length of the space occupied by the perforations or by the hole-spaces on the card, is greater than the length of the steps through which the sector turns, yet each advance of the sector brings the pair of blocks P, P′, to a position in line with and overlapping its previous position and produces a different combination of perforations. The space between the centers of the types is equal to the successive advancing steps of the sector, but is only a fraction of the length of the perforated record made. By this arrangement we secure the making of perforated records, each of which is of considerable length, by fractional advances of the punch operating member relative to the punches and thus by a comparatively short movement of the parts. This fractional advance, therefore, makes for a simple compact arrangement of the type and for a comparatively short movement between the punches and their operating member. Various other arrangements are illustrated in my patents above cited and in other patents of mine for securing this relative movement between the punches and their operating means through a distance which is only a fraction of the length of the space occupied by the perforations.

The forward movement of the frame is effected as follows: The shafts X and Y and the shaft 24 are all carried between an upper plate 25 and a lower plate 26. The master wheel R which drives the several shafts X is mounted on the upper plate 25, but the pinion S by which the master wheel is driven is mounted in a separate frame above the plate 25, so that the master wheel may be carried forward with the plate 25 upon which it is mounted and with the several mechanisms inclosed between the plates 25 and 26 (these plates being firmly connected to each other by the shaft described and by additional tie-rods or bolts at various points). See Figs. 8, 14 and 20. At the rear the plates 25 and 26 are connected to each other by stiff uprights 27 which in the continued rotation of the hand-shaft E are engaged by pins 28 projecting laterally from arms carried on said shaft so as to press said uprights and the entire frame forward against the resistance of the strong springs 29 connected to uprights 30 at the rear and holding the frame carrying the recording mechanism normally in its retracted position against said uprights.

The hammers for actuating the type operate on a principle familiar in adding machines, of the Burroughs type for example. The hammer 14, Figs. 20 and 21 is normally retracted by a spring 31, being pivoted at 32 and being actuated with a sudden movement by a flange 33 overhanging the forward arm of the hammer, and which is mounted on a follower 34 pivoted on the same pivot 32 as the hammer. The member 34 with its flange 33 is normally restrained by a resetting pin 35, which however at each operation of the machine moves out of engagement with the member 34 so as to allow the strong spring 36 of the latter to swing the flange 33, and with it the hammer, forward.

The resetting rod 35 which serves for all the hammers is connected by suitable arms to the shaft 32 by which it is actuated. This shaft runs through the top plate 25, and at its upper end has an arm 32[a] which connects with a link 32[b] the opposite end of which passes around an eccentric 32[c] on the shaft 24 of the several sectors, and this eccentric is turned in the forward movement of the plate and shifts in a direction to release the several hammers, and in the rearward movement in a direction to reset the hammers.

A stop 37 is provided for preventing the operation of the hammers when the card is put in the machine the first time. The stop 37 is pivotally mounted on a shaft 38, and has an arm 39 connected to a spring 40 by means of which the stop 37 is held as far forward as possible. The shaft 38 is fixed; that is to say, does not partake of the forward movement of the disks in the making of a record. The shaft 32 which carries the hammers and followers 34, however, does partake of such forward movement. Such movement, however, is not sufficient normally to carry the end of the arm 34 beyond the stop 37 so as to permit the operation of the hammers.

On the second operation for the same card the stop 37 is turned inward slightly so that when the hammers and followers are brought forward the follower 34 will carry its forward end clear of the stop 37 and will be free to actuate its hammer. The movement of the stop 37 is effected by means of an arm 41 carried on the lower end of the shaft 38 and projecting toward the center of the machine. This arm is shown in section in the bottom of the machine in Fig. 8, and is in the path of a striker 42 (by the action of the card on a link 118 carrying said striker 42, as hereinafter described under "Card control at second operation") which moves to the rear when a card is introduced into the machine which has been previously operated on. The striker 42 throws the inner end of the arm 41 inward and turns the shaft 38 and stop 37 to carry the latter to a point where it no longer locks the follower of the hammer.

The same stop 37 is used to prevent the striking of zero for the highest decimal places; that is to say, to suppress the zeros in decimal places higher than the number actually printed.

*Previous-reading mechanism.*—For impressing upon the previous-reading sectors *p* a movement corresponding to the previous reading as perforated in the card, mechanism may be employed similar to those described in my application No. 427,859 above referred to, or in my application No. 479,189. The mechanism is simplified however by the use of the preferred system herein described in which four holes are punched in five spaces on the card. The middle space is not used. Consequently the feelers 43 (Fig. 16) are arranged in groups of four occupying the first two and last two of five horizontal spaces. These feelers are pressed forward by springs when the card is inserted, and one or more of the feelers enters and passes through the card in accordance with the combination of holes which the group of feelers meets. The combination of feelers which moves through the card determines or limits the movement which the sector *p* receives under the influence of the spring which tends to turn it. The several feeling pins 43 of each group are connected to slides 44 which are bent to pass around the central shaft 24 and which are connected at their rear ends to the rear ends of springs 45, the forward ends of said springs being connected to an upwardly projecting flange 46 on a frame 47 of which there is one supported above each of the previous-reading sectors and fixed relatively thereto. In making a record the frame 47 moves forward and conveys the necessary yielding forward pressure to the individual slides 44. The backward movement of the slides is effected by means of an arm 48 lying in the same plane with the frame 47, the arms 48 for the several previous-reading mechanisms being fixed on a common shaft 49 by which they are actuated. The slides 44 are provided with pins 50 adapted to be engaged by the rear edge of the arm 48 to withdraw the slides. The shaft 49 is connected at its upper end, Fig. 14, to an arm $49^a$ and a link $49^b$ which runs downward through the plate 25 and is connected just below that plate to an arm 28, Fig. 15, which swings forward whenever a card is properly placed in the machine, as hereinafter described in detail, and thus releases the slides which carry the feeling pins. A compound control is called for in order to secure the desired movements of the sector *p* from the four slides 44. The slides 44 are normally stopped by means of a pin 51 carried on an arm 52 which is pivoted to the sector *p*; the pin 51 being caught and held by a shoulder on a main controlling arm 53. The controlling arm 53 is provided with a stop-arm 54 which is provided with a series of stops adapted one after another to engage the first supplementary stop-arm 55 as the latter is swung outward about its pivot 56. The first supplementary stop-arm 55 furthermore is pivotally mounted at 56 upon a second supplementary stop-arm 57 which is pivoted on the shaft 24 and whose movement carries with it the first supplementary arm 55 as well as the main stop-arm 53. The arm 55 is held inward upon the arm 57 by a spring 58.

The movement of the first supplementary stop-arm 55 about its pivot is effected by means of pins $58^a$ projecting upward from the slides 44 and engaging the inner edge of the arm 55. The movement of the second supplementary stop-arm 57 is determined by stops 59 projecting downward from the slides 44 and adapted when sufficiently advanced outwardly to lie in the path of one of the shoulders 60, 61, $61^a$ on the arm 57, so as to limit the amount of forward movement of said arm. The several pins 43 move forward through the card to different distances, and the slides 44 with them. Each slide moves forward always until a stop $61^a$ on the under side of its rear end strikes the outer edge of the fixed frame 47. See Fig. 8. It is the selected slide 44 which determines the movement of the arm 57. The extent of movement of the slide, however, has an important effect in determining the amount of movement contributed thereby to the first supplementary stop-arm 55, since the pins $58^a$ carry said arm forward a distance corresponding to the movement of the pin or pins.

The stop-arm 57 is held in its normal position by a light spring 62 fastened to the frame 47, and is stopped by a stop-pin 63. The sector *p* is supported from a central hub by means of arms 64 and 65, the latter being provided with an upward flange 66 lying in the plane of the main stop-arm 53. When a subtracting operation of a larger from a smaller number is effected and it is necessary to reduce the number in the next higher decimal place by 1, this is effected by increasing by one step the forward movement of the previous-reading sector *p* of the next higher decimal place. The space between the flange 66 on the arm which carries the sector *p* and the stop-arm 53 which limits the movement of said sector is normally one unit. When such a carrying operation as has just been referred to is to be performed, the arm 52 is pulled outward by means of an arm 67 on a shaft 68 and having a roller lying in a slot in said arm 52. This withdraws the pin 51 from engagement with the arm 53 and allows the sector *p* to move forward one more step than would normally be the case, and until the flange 66 strikes the stop-arm 53 and prevents further movement of the sector. The several sectors are preferably guided in their horizontal planes by spacers or guides 69 held in place by rods 70 connecting the upper and lower plates which carry the several sectors.

The carrying operation is effected as stated by throwing the arm 67 outward. Each of the arms 67 is mounted on the upper end of a sleeve on the lower end of which is an arm 71, Fig. 20, projecting under the plane of the next lower clock-controlled sector *o*. The plate 72 upon which the clock-controlled sector *o* and its types 12 and punch-actuating blocks P are mounted, is provided on its under side in the plane of a roller carried on the end of the arm 71, with a cam or projection 75. When the sector *o* moves through a distance corresponding to the first series of ten digits the forward end of the projection 75 moves just to the point where it engages the end of the arm 71. In the further movement of the sector corresponding to the second series of digits, the projection 75 presses out the end of the arm 71 and turns the sleeve on the shaft 68, which sleeve is connected in the plane above (Fig. 16) with the arm 67 of the previous-reading sector of the next higher decimal place. Consequently when the types move only through the first series there is no movement of the carrying arm 67 of the next higher decimal place; and when the types of the second series of digits move into operative position there is a movement of the arm 67 in the next higher decimal place. To accomplish this result the recording mechanism is set to start from a point corresponding to minus one, instead of from a point corresponding to zero. Unless there is a movement of the carrying arm 67 therefore the number recorded will be one less than that which would be recorded if there were no carrying operation; and whenever the number in the next lower decimal place is obtained by subtracting a smaller from a larger number, that is to say, whenever the seceond series of types comes into play, an additional step forward is given to the record mechanism of the next higher decimal place to compensate for the original minus-one position of the parts.

The several sectors are reset in their starting positions (Figs. 16 and 17) by a rod 76 which is supported at its upper end upon an arm 105 free to turn on the shaft 24 and adapted to be engaged by a pin 104 on a loose arm 77 which is connected by a spring 78 to the fixed wall 79 at the rear of the pocket, and connected also by a flexible steel band (made in two connected parts 80 and 81, Figs. 15 and 24) which runs over a guide pulley 82 at the rear of the machine with a sector 83 on the hand-shaft E. When the hand-shaft is turned backward, the ribbon 81 is wound on the sector 83, and by the connection at its upper end turns the arm 77 and the resetting rod 76 forward to restore the various sectors to their initial positions. When the hand-shaft E is operated in the forward direction it unwinds the ribbon 81, 80 and releases the arm 77 so that the spring 78 turns the latter and frees the various sectors. Springs such as 84, 85 (Fig. 20) then give to the sectors the forward rotary movements described. These two springs 84, 85 are both connected to the single plate 72, two springs being used for the sake of compactness in vertical dimensions. These springs serve also to give the previous-reading sector its movement. The sector *o* engages the clock-driven gear *h* and turns it until its lug *u* strikes the corresponding lug *q* on the previous-reading gear *m*, and then rotates this previous-reading gear and with it the previous-reading sector *p* to a distance determined by the previous reading, as above described.

When there is no previous reading the stop-arms 53, 55 and 57 of Fig. 16 are not moved under control of the slides 44, and there should be no movement of the sector *p* except one step forward to cancel the minus-one starting position. This is insured by a fixed stop 86 constituting preferably a part of the frame 47 and lying in the path of a portion 87 of the first supplementary stop-arm 55; so that if this arm be not moved by any movement of the feeling pins the sector will be limited to one step forward. If, on the other hand, the arm 55 is swung outward then the part 87 will clear the fixed stop 86, and free movement will be permitted.

*Card-controlled mechanisms.*—The card by a punch in one of the spaces H (Fig. 2) selects the particular rate by which the time is to be multiplied. According to whether or not the card is properly located in the pocket, its setting holes J determine whether or not the machine shall operate, the mechanism for effecting this result being denominated "setting mechanism." If the card has a punch Q therein, indicating that this is its second record, it controls mechanism (described hereinafter under "Card control at second operation") for shifting its position in the pocket so as to bring the second record in proper position on the card, and for insuring the printing of the record instead of only the perforating of it as in the first operation.

*Card selection of rate mechanism.*—The several movable shafts Y are carried in arms 88 similar to the arms *z* of Fig. 25 and the positions of which are indicated in Fig. 15. These arms are mounted on fixed shaft 89, and are connected directly, or through intermediate arms in order to secure the correct angle, to links 90 by means of which the shafts Y are drawn inward, and to springs 91[a] by which they are drawn outward. The several links 90 are connected to levers 92 at the front of the machine, which, as shown in Figs. 15 and 22, are connected by means of suitable sleeves with arms 91 the ends of which are engaged by collars 92ᵃ on feeling pins 93 pressed forward into the pocket by springs and arranged in vertical pairs in such position that each pair of pins corresponds to the two successive positions of a particular one of the rate controlling spaces H of the card in its first and second operations respectively. When the card has a perforation in a space corresponding to the lower one of any pair of feeling pins 93 when the card is first put in the pocket, said lower pin 93 will move forward under the influence of its spring, and will carry the arm 91 forward and will pull the corresponding shaft Y inward. At the next operation on the same card the corresponding feeling pin 93 of the pair will do the same work.

*Setting-pin mechanism.*—The setting pins 94 are provided with tapered ends and are adapted to pass through holes 95 in the walls of the pocket, and to engage the holes J in the card, engaging successive ones of each pair of holes in each of the successive uses of the card; and forcing the card to an accurate position. These setting pins 94 are carried on arms 96 on a shaft 97 (Figs. 14 and 15) which at its upper end has an arm 98 with a pin 99 on its under side which is normally engaged by a shoulder on a hook 100 and held inward until a card is fully entered into the pocket, after which the hooked rod 100 is drawn forward and the setting pins 94 are pushed into the holes and set the card accurately. At the same time the arm 98 operated by the setting pins serves to throw into gear the shaft $Y^7$ which controls the upper set of recording mechanisms for recording units of time. For this purpose the sleeve *y* which carries the arm *w* by which the shaft $Y^7$ is shifted, is connected by an arm 101 to a link 102 which at its forward end is connected with the arm 98 on the upper end of the setting pin shaft 97.

The rod 76 by which all the sectors are normally restrained is released only when the setting pins operate. To effect this purpose the upper end of the rod 76 is engaged by a hook 103 which is connected to the link 102 and which releases the rod 76 whenever the link 102 is moved forward by the entrance of the card fully into the pocket and the passage of the setting pins into holes in the card. Otherwise although the handle be pulled, there will be no movement of the sectors to recording positions and no record will be made. The control of the rod 76 from the arm 77, for resetting the said rod, is effected by means of a pin 104 carried by the arm 77 and engaging the rear edge of the arm 105 at the end of which the rod 76 is carried. The arm 77 moves in a direction to release the mechanism at each operation of the hand lever and to reset it at each return of the hand lever, whether it needs resetting or not. The arm 105 carrying the resetting rod 76, however, is merely freed from control of the handle when the latter is moved. It will not yield to the springs tending to actuate the recording mechanism unless it is first released from the hook 103.

The hooked rod 100 is drawn to the right at its forward end by a spring 106 so as to hold it in engagement with the pin 99, and is drawn to the rear by a spring 107 at its rear end fastened to the under side of the top plate, as shown in Fig. 8. At each forward movement of the hand shaft E the bar 100 is pushed forward by means of the angle lever 108 connected to its rear end, and the link 109 which is forced upward by the connection of its lower end with an arm 110 carried on the hand shaft. The link 109 has a slot in which lies a roller on the side of the angle lever 108, and the bottom of the slot strikes the roller in the latter part of the forward movement of the handle and throws the bar 100 forward so that the shoulder 111 thereon passes beyond the advanced position of the pin 99, whereupon the spring 106 pulls the end of the bar to the right so that the shoulder is in position to engage the pin 99 and carry it back to its starting position. When the handle F is moved backward the lower end of the slot in the member 109 releases the arm 108, and the spring 107 tends to retract the bar 100. The retractile movement, however, is prevented by a shoulder on the end of the arm 108, which strikes a shoulder on a pivoted stop 110ᵃ. At the very last part of the backward stroke of the handle, however, the stop 110ᵃ is pressed back by a pin 110ᵇ carried on the arm 110, and this releases the arm 108 and allows the locking bar 100 to move to the rear. The bar 110ᵃ is pulled forward by a spring 110ᶜ. The links 109 are connected at their upper ends to a rod 109ᵃ extending between the rear guides 30 and connected to a dash-pot 109ᵇ, and two springs 109ᶜ by which the speed of movement of the hand shaft is controlled and the handle is retracted after a forward stroke.

The first release of the pin 99 from the shoulder of the bar 100 is by pulling the latter inward against the stress of its spring 106. This is accomplished by means of a hook 112 engaging a pin 113 on the forward end of the bar 100 and connected to a horizontal lever 114 the forward edge of which is engaged by a vertical arm 115, which, as shown in Fig. 8, is mounted on a horizontal shaft 116 and is connected to an arm 117 which in turn is connected to a link 118 at the lower end of which is carried the extension or plate 42 which is struck by the lower edge of the card when the latter is shoved down into its pocket. The downward movement of the link 118 causes a movement toward the rear of the vertical arm 115 which swings the horizontal lever 114 and pulls the bar 100 inward as stated. When the card is withdrawn the bar 100 has already been restored by the backward movement of the handle to the position of Fig. 15, and the horizontal lever 114 is swung to the right by a light spring and the hook 112 rides over the pin 113 into position for the next operation.

The shafts 97 and 97[a] which carry the arms controlled by the selecting and the setting pins are mounted in an arm 97[b] (Fig. 14) supported at its inner end upon a fixed pivot 97[c] and connected at its outer end to the upper plate 25 by which the several sectors are carried, so that on the forward movement of the plate 25 to effect a punching operation the pivots 97 and 97[a] will be moved forward so as to avoid any tendency of the setting pins 94 and rate pins 92 to move inward under the influence of the forward movement of the mechanisms connected to the outer ends of the arms carried on the shafts 97 and 97[a].

*Card control at second operation.*—The first time that a card is introduced into the machine it moves downward and strikes the plate 42 as previously stated. On the next operation its downward movement is limited by a plate 119 on the same link 118, so that the mechanism controlled by said link is operated the same as at the first operation. The link 118 is pivoted at 120 on the arm 117, and its upper end is pressed backward at the second operation on a card. This is effected by a small sector 121 containing a feeler pin 122 which is pressed forward by a spring, the sector being rotatably mounted on a pin 123 and carrying at its lower corner a roller 124. When a card is placed in the pocket the roller is forced down, carrying the sector with it, and bringing the feeler pin against the card. If the card has not been perforated by a first operation, the feeler pin yields and the card passes downward without further effect. If as the card passes downward however the feeler pin finds a hole Q in the card, it springs into such hole, and the further movement of the card carries the sector down and causes the forward movement of an arm carrying a pin 125, which pin strikes the upper end of the link 118, pressing it backward for the purpose explained. The feeler pins 122 are retracted on the forward movement of the sectors by means of a projecting member 126 fixed on the plate 25. The shaft 123 upon which the sector 121 is mounted is in turn movable, being carried in arms 127 pivoted upon a pin 128. The member 126 in its forward movement strikes the pin 123 and pushes it with its sector and feeling pin out of operative position, and it is caught and held by a pin 128[a] catching over a spring pawl 129. This pawl is operative as long as there is a card in the pocket. When there is no card in the pocket, however, the spring pawl 129 is pressed downward by a pin 130 carried on the end of an arm 131 which is mounted on a pin 132 which carries another arm 133 at the end of which is a roller 134 lying at the rear of the pocket and projecting into the path of a card. As long as a card is in the pocket the roller 134 is pressed back and the spring pawl 129 is operative, but when there is no card in the pocket the roller 134 springs forward and the pin 130 presses down the spring 129 and holds it out of operation so as to let the pin 123 and the sector carrying the feeler pin 122 stand in operative position.

*Earning time mechanism.*—In order that the time occupied by the usual noon recess shall not be charged against the cost of the work, automatic mechanism is preferably provided for disconnecting the clock-driven shafts X from the clock during such a recess. The mechanism is shown in side elevation in Fig. 8, and the several parts in plan in Figs. 10 to 13. The first driving shaft is the shaft 135 which is driven from the clock gearing by any suitable intermediate train of gears. In the example shown it is designed to make one revolution every two hours and a half. The motion is transmitted from the shaft 135 to the wheel S which drives the master wheel R, by means of intermediate gears mounted on a shaft 136. Upon a sleeve on the shaft 136 are provided a lower pair of disks 137 and 138 rotating at the rate of one revolution every five hours; and an upper pair of disks 139 and 140 rotating at the rate of one revolution every twenty-four hours; and these disks are used on a principle familiar in clock-controlled mechanisms, the slower ones to control the actuation of the connecting and disconnecting mechanism only once a day, and the faster ones to secure accuracy to a finer degree than could be assured with the slow-moving disks. A third pair of disks for securing the greatest accuracy, 141 and 142, is stationary, but the clock mechanism is given a rotation relatively thereto at the rate of one revolution every half hour. Coöperating with the several lower wheels 137, 139 and 141, are arms 143, 144 and 145 respectively, which are mounted on a common sleeve on a pin 146, so that the three arms must move together, and having each on the under side of its free end a roller adapted to drop into a notch in the edge of its controlling disk. It is only when the edges of the three controlling disks are in operative positions immediately opposite the rollers on the ends of the several arms that such action can take place. Coöperating with the notched upper disks 138, 140 and 142, are similar arms 147, 148 and 149 connected to each other and mounted on a common vertical shaft 150. The pins 146 and 150 are rotated once every half hour about the shaft 136 as stated above. Springs 144ᵃ and 148ᵃ pull the arms 144 and 148 inward. Mounted below the disks 141 and 142, and pivoted on the shaft 150 so as to swing with said shaft and with the several arms carried on the two shafts 150 and 146 and to rotate continuously about the central shaft 136 is the ring V previously referred to, and this ring is therefore rotated at the rate of one revolution every half hour, and when in engagement with the gear U (through the tooth W engaging said gear) drives the shaft T and the gear S at this rate. For the purpose of throwing it into and out of gear the ring V is provided at a point opposite its pivot with a pin 151 which projects upwardly between the extended ends of the arms 145 and 149. When the arm 149 swings inward, the pin 151 is moved to the left and the clock is connected to the gear U so as to communicate motion thereto. When the arm 149 swings outward, it does not alter the situation, but as soon as the opposite arm 145 swings inward the clock mechanism is disconnected from the gear U. Thus at intervals determined by the three upper disks of the several pairs the mechanism is connected to the clock at the appropriate time, and by the position of the lower disks of the three pairs the mechanism is disconnected when earning time is interrupted. The disks are so arranged that the connection is made at eight o'clock in the morning, broken at twelve o'clock, remade five hours after the first connection, that is, at one o'clock, and broken again five hours after the first break, or at five o'clock; but of course any desired distribution of time may be provided for.

Hand operated or automatic clutches and gears may be added for the purpose of driving the mechanism at a faster rate when the work is being done over time. In many cases over-time work costs one and one-half or two times as much as regular day work, and the provision of such a clutch and gearing would take care of this difference in cost. A suitable gearing for the purpose is illustrated in my previous application No. 427,859, (Pat. No. 1,219,765) above referred to.

What I claim is:—

1. A machine of the class described including in combination clock-driven mechanism, rate mechanisms driven by said clock-driven mechanism, recording mechanism controlled by said rate mechanisms, and card-controlled selecting means for selecting the different rate mechanisms.

2. A machine of the class described including in combination recording devices, a number of parallel sectors controlling the positions of said devices, rate gears parallel with said sectors and adapted to be moved into and out of engagement therewith, and clock-driven gears parallel with said rate gears and adapted to engage said rate gears when the latter are thrown out of engagement with said sectors.

3. A machine of the class described including in combination recording devices, a number of parallel sectors controlling the positions of said devices, rate gears adapted to be moved into and out of engagement with said sectors, clock-driven gears adapted to engage said rate gears when the latter are thrown out of engagement with said sectors, and a clock driving said clock driven gears and having its axis parallel to those of said sectors and gears.

4. A machine of the class described including in combination recording devices, a number of parallel sectors controlling the positions of said devices, rate gears adapted to be moved into and out of engagement with said sectors, clock-driven gears adapted to engage said rate gears when the latter are thrown out of engagement with said sectors, and a hand shaft for actuating said devices and extending in a line parallel to said sectors and gears.

5. A machine of the class described including in combination recording devices, a number of parallel sectors controlling the positions of said devices, rate gears adapted to be moved into and out of engagement with said sectors, clock-driven gears adapted to engage said rate gears when the latter are thrown out of engagement with said sectors, and means for shifting said sectors in a direction parallel with their planes.

6. A machine of the class described including in combination recording devices, a number of parallel sectors controlling the positions of said devices, rate gears parallel with said sectors and adapted to be moved into and out of engagement with said sectors, clock-driven gears parallel with said rate gears and adapted to engage said rate gears when the latter are thrown out of engagement with sectors, and a pocket for a controlling card arranged transverse to the planes of said sectors.

7. In a machine of the class described a rate mechanism including in combination a rate gear normally continually advancing, a sector whose movement is to be controlled by said rate gear and sector into engagement and for stopping said gear from rotation beyond a zero point, and means for shifting the point at which the rotation of said gear is stopped.

8. In a machine of the class described a rate mechanism including in combination a rate gear normally continually advancing, a sector whose movement is to be controlled by said rate gear, means for bringing said gear and sector into engagement and for stopping said gear from rotation beyond a zero point, and means for shifting the point at which the rotation of said gear is stopped to a point determined by the extent of a previous movement of said sector.

9. In a machine of the class described a rate mechanism including in combination a rate gear normally continually advancing, a sector whose movement is to be controlled by said rate gear, a previous-reading gear adjacent to said gear and a stop carried by said previous-reading gear for preventing rotation of said rate gear beyond a point determined by the position of said previous-reading gear.

10. In a machine of the class described in combination a clock shaft, record controlling mechanism driven thereby, disks driven by the clock at different rates of speed and which on simultaneously assuming a determined position effect the breaking of the connection to said driven mechanism, and similar disks effecting the making of such connection.

11. In a machine of the class described a recording sector, types and punching devices carried by said sector in parallel planes, means for turning said sector to bring said types and punching devices to a desired position, and means for advancing said punching devices and said types to make a record.

12. In a machine of the class described a recording sector, types and punching devices carried by said sector in parallel planes, means for advancing said sector by steps equal to the distance between centers of successive types to bring said types and punching devices to successive operative positions, and means for advancing one of said types and said punching devices to make a printed record and a punched record consisting of a plurality of perforations occupying a space the length of which in the direction of the movement of the sector is greater than one of said advancing steps of the sector.

13. In a machine of the class described a recording sector, types and punching devices carried by said sector in parallel planes, means for advancing said sector by steps equal to the distance between centers of successive types to bring said types and punching devices to successive operative positions, and means for advancing one of said types and said punching devices to make a printed record and a punched record consisting of a plurality of perforations occupying a space the length of which is greater than one of the advancing steps of the sector.

14. In a machine of the class described a type carrier and a punching means arranged to advance together to operative positions, corresponding to successive types on said carrier, and means for operating one of said types and said punching means to print a single character and to punch the same character in the form of a plurality of perforations occupying a space the length of which in the direction of the advance of the punching means is greater than the extent of such advance between positions corresponding to two successive types.

15. In a machine of the class described a type carrier and a punching means arranged to advance together to operative positions corresponding to successive types on said carrier, and means for operating one of said types and said punching means to print a single character and to punch the same character in the form of a plurality of perforations occupying a space the length of which is greater than the extent of the advance of the punching means between positions corresponding to two successive types.

16. In a machine of the class described a recording mechanism including a punching means arranged to advance by successive steps to successive operative positions in line with and overlapping one another, and means for actuating said punching means in its operative position to make a punched record consisting of a plurality of perforations occupying a space the length of which in the direction of said advancing steps is greater than one of said steps.

17. In a machine of the class described a recording mechanism including a punching means the parts of which are in fixed relation to one another, said punching means being arranged to advance by successive steps to successive operative positions and means for actuating said punching means in its operative position to make a punched record consisting of a plurality of perforations occupying a space the length of which is greater than one of said steps.

18. In a machine of the class described in combination a set of punches, an actuating device therefor, the parts thereof which actuate the different punches of the set being in fixed relation to one another, and means for effecting a step-by-step relative movement between said punches and their actuating device to bring them to successive operative positions for actuating the punches in different combinations, the length of said steps being a fraction of the length of the space occupied by said punches.

19. In a machine of the class described a recording sector, recording devices carried by said sector, said sector having teeth by which it may be turned, and a plurality of controlling gearings arranged around said sector and adapted to engage said teeth at different points.

20. In a machine of the class described in combination, a recording mechanism and means for automatically suppressing the action of part of said mechanism when a card is in proper position to receive a record, said means being adapted to be controlled by perforations in a card.

21. In a machine of the class described in combination, a recording sector, types carried thereby, a hammer for printing with said types, and means for suppressing the action of the hammer when a first record is made on a card and for allowing such action when a second record is made on the same card.

22. In a machine of the class described in combination, a recording sector, types carried thereby and arranged in two series, and "carrying" means actuated only when one said series is brought to operative position.

23. In a machine of the class described in combination a recording mechanism including a sector, a clock-driven gear, means for bringing said gear and sector into engagement, and means for rotating said sector in a direction to turn said gear forward to its zero point and to thereby bring the recording mechanism into position to record the advance which had been made by said gear at the time of its engagement with the sector.

24. In a machine of the class described, a sector, means for limiting the movement of said sector in accordance with a previous reading, and a plurality of gears along the edge of said sector and adapted to be engaged therewith and to have their rotation limited correspondingly.

25. In a machine of the class described a previous-reading sector, stop mechanism arranged to begin each normal movement of the sector from its minus-one position, and secondary stops for permitting a one-step movement of the sector when there is no previous reading.

26. In the machine of the class described a clock-driven gear, a zero stop for said clock-driven gear, a previous-reading controlled gear operating said zero stop, a recording mechanism adapted to be set for the original position of the clock-driven gear by a continued forward movement of the latter to its normal position, and means for determining a continued forward movement of said zero stop in accordance with the previous reading.

27. In a machine of the class described a previous-reading sector, a plurality of stop members limiting the movement of said sector, and feeling pins, one of which is provided with means for controlling a plurality of said stop members.

28. In a machine of the class described a previous-reading sector, a plurality of stop members limiting the movement of said sector, one mounted on the other and movable relatively thereto.

29. In a machine of the class described a previous-reading sector, and feeling pins adapted to control one of said stop members by the lengths of their movements and another of said stop members by their relative lateral positions.

30. In a machine of the class described a previous-reading sector, and feeling pins controlling the movement of said sector and located at a number of spaces one greater than the number of pins.

31. In a machine of the class described a plurality of rate mechanisms and card-controlled selecting mechanism for selecting said rate mechanisms.

32. In a machine of the class described a card-controlled selecting mechanism for selecting the rate, including in combination rate shafts, a series of links for shifting the several rate shafts, rate pins corresponding in position to the different rate spaces on the cards and connected to the respective links, and means for causing the pin which finds a corresponding hole in the card to enter and to actuate said link and the corresponding rate shaft.

33. In a machine of the class described card-controlled selecting mechanism for selecting the rate, including in combination rate shafts, a series of links for shifting the several rate shafts, rate pins corresponding in position to the different rate spaces on the cards and connected to the respective links, means for causing the pin which finds a corresponding hole in the card to enter and to actuate said link and the corresponding rate shaft, and means for withdrawing and restraining said pins until a card is introduced.

34. In a machine of the class described card-controlled selecting mechanism for selecting the rate, including in combination rate mechanism, selecting pins, levers actuated thereby and connected to the rate mechanism, means for shifting said rate mechanisms, in making a record, and the support of said levers being shiftable to avoid disturbing the relation of said selecting pins to the rate mechanisms.

35. In a machine of the class described a setting pin in combination with a duration rate gear and adapted to render the latter operative at each operation of the machine.

36. In a machine of the class described a setting pin in combination with a duration rate gear and adapted to render the latter operative at each operation of the machine, and the several monetary rate gears one or another of which is selected and rendered operative at each operation of the machine.

37. In a machine of the class described a recording mechanism and a setting pin adapted to enter a card by a movement transverse to the plane of the card in combination with a latch which holds the recording mechanism in its normal position, and means for withdrawing said latch upon the entrance of the setting pin.

38. In a card-controlled machine of the class described a setting pin in combination with means for withholding the setting pin until a card has been introduced.

39. In a machine of the class described in combination recording mechanism, a setting pin adapted to enter a card by a movement transverse to the plane of the card, a lever actuated thereby and connecting to a part of the recording mechanism, said recording mechanism being shifted in making a record, and a shiftable support for said lever to avoid disturbing the relation of the setting pin to the recording mechanism in making a record.

40. In a card-controlled machine of the class described a setting pin in combination with means for withholding the setting pin until a card has been introduced, and means for resetting said withholding means and withdrawing the setting pin.

41. In a card-controlled machine of the class described an operating shaft and a setting pin in combination with means for withholding the setting pin until a card has been introduced, and means actuated by said shaft for resetting said withholding means and withdrawing the setting pin only at the end of a backward movement of the shaft.

42. In a card-controlled machine of the class described a stepped support for the lower edge of the card and means controlled by a card for causing an advance of said support to a point where it supports the card in a different position on its second insertion into the mechanism.

43. In a machine of the class described in combination a pin and means for bringing it against the card before the card is moved entirely into the machine, said pin being adapted to be held back when it does not find a perforation or to enter such a perforation when it finds one and to be carried along with the card, and means for withdrawing said pin on the operation of the machine.

44. In a machine of the class described in combination a pin and means for bringing it against the card before the card is moved entirely into the machine, said pin being adapted to be held back when it does not find a perforation or to enter such a perforation when it finds one and to be carried along with the card, means for withdrawing said pin on the operation of the machine, and means for restoring said pin to its initial position on the withdrawal of a card.

45. The combination of a computing device, a cam for controlling it, means for moving the cam to represent different values, and actuating means for operating the computing device, the said actuating means being controlled by the cam and adapted normally to be in engagement therewith but during the operation of the computing device to be moved out of such engagement.

46. In the subtracting mechanism of an elapsed time indicating machine, a subtractor device provided with two projections for controlling the extent of its subtracting movement one projection adapted to be used in its ordinary subtracting movement and its other projection adapted to be used for borrowing purposes.

47. In an elapsed time recording machine the combination of elapsed time printing mechanism and punching device, the said mechanism and punching device adapted respectively to print and to punch the elapsed time between two operations of the machine, and operating means adapted to cause the printing mechanism to print and the punching device to punch the elapsed time between two operations of the machine.

48. In an elapsed time indicating machine the combination of a punching device adapted to punch holes representing elapsed time between two operations of the machine, and means adapted to be affected by both of said operations to cause the punching device to punch holes representing in and by themselves the elapsed time between the said two operations of the machine.

49. In an elapsed time indicating machine, a punching device adapted at a first operation of the machine to punch the time of such operation or "In" time and at a second operation of the machine to punch the elapsed time between the said two operations.

50. The combination with perforated cards of a machine of the class described, having setting pins adapted to move into and out of engagement with perforations in the cards and adapted when in engagement with a card to hold it in position, and means actuated by the introduction of said card for causing the movement of said setting pins.

51. The combination with a perforated card of a machine of the class described adapted to receive said card with its perforations in any one of a plurality of positions, and having mechanisms controlled by said perforations in any one of said positions.

52. A machine of the class described into which a card may be thrust and having setting pins for engaging and holding the card in position, and means actuated by the introduction of the card for causing the operation of said setting pins.

53. A machine of the class described into which a card may be thrust and having setting pins for engaging and holding the card in position, and means actuated by the introduction of the card for causing the operation of said setting pins, and means for automatically withdrawing said pins near the end of an operation of the machine to permit the withdrawal of the card.

54. The combination with a perforated card of a machine of the class described adapted to receive said card in any one of a plurality of positions, said machine including a registering or recording mechanism and controlling means therefor, said controlling means being controllable from said card in any one of said plurality of positions.

55. The combination with a perforated card, of a machine of the class described including feeling pins adapted to enter combinations of perforations in said card, all the pins of a combination moving the same distance, and stops controlled by said pins.

In witness whereof I have hereunto signed my name.

JOHN ROYDEN PEIRCE.